United States Patent [19]
Jorn

[11] 3,873,077
[45] Mar. 25, 1975

[54] COMPOSITE SPRING ELEMENT

[76] Inventor: Raoul Jorn, 53 1/7 Post Wasserburg a.B., Hengnau, Germany

[22] Filed: June 24, 1974

[21] Appl. No.: 482,631

[30] Foreign Application Priority Data
Sept. 12, 1973 Germany............................ 2345990

[52] U.S. Cl. .............................................. 267/152
[51] Int. Cl............................................... F16f 1/26
[58] Field of Search................. 267/152, 63 R, 63 A

[56] References Cited
UNITED STATES PATENTS
3,544,176  12/1970  Slater................................. 267/152
3,730,509   4/1971  Jorn .................................. 267/63 R Primary Examiner—James B. Marbert
Attorney, Agent, or Firm—Karl F. Ross; Herbert Dubno

[57] ABSTRACT

A spring element is formed of a pair of generally parallel elongated first leaf springs which are bendable but relatively incompressible and which have spaced-apart inner ends and opposite spaced-apart outer ends. A second bendable but relatively incompressible leaf spring has an inner end spacedly received between and parallel to the inner ends of the first springs, and an outer end turned away from the first springs. The outer end of the first springs are held apart by a rigid spacer. A respective body of elastomeric material is received between each of the inner ends of the first springs and the inner end of the second spring, this body being bonded to these inner ends. A plurality of such springs may be provided whose inner ends are interleaved with the inner ends of a plurality of such first springs. Similarly the second leaf springs can be composed of a pair of congruently overlying but spaced-apart leaves having inner ends each bonded to an elastomeric body itself bonded to a respective inner end of a respective first leaf spring. The leaf springs are all tapered from their outer ends toward their inner ends.

11 Claims, 10 Drawing Figures

//3,873,077

COMPOSITE SPRING ELEMENT

FIELD OF THE INVENTION

The present invention relates to a composite spring element. More particularly this invention concerns such a spring element usable in a motor vehicle as an engine mount.

BACKGROUND OF THE INVENTION

There is disclosed in my U.S. Pat. No. 3,730,509 granted on 1 May 1973 a composite spring element formed of a plurality of leaf springs which are parallel to each other and which each have a supported side and a deflectable load-engaging side. A body of elastomeric material is received between the springs and is bonded to at least one of them and is engageable with the other spring after some deflection at least of the element. This spring element is elongated and bolted at one end to the load and at the other end to the support so that the springs, which are made of very rigid material such as steel, serve to support the load while the elastomeric body damps vibration. The springs can be bolted at one end and can be of differing lengths, with the longest spring formed at its free end with the eye adapted to receive a bolt on the load. The springs can also be annular with a plurality of inwardly extending tabs bent away from the plane of the outer periphery. The elastomeric body is of soft rubber or rubber mixture capable of withstanding heat and resistant to destruction by oil. Such a spring is intended for use supporting the internal-combustion engine in a motor vehicle.

OBJECTS OF THE INVENTION

It is an object of the present invention to provide an improved spring element.

Another object of this invention is to provide a spring element of the above-described general type which offers several advantages thereover.

More particularly this invention is concerned with a composite spring element which offers superior suppression of noise transmission.

Another object is the provision of such a composite spring which has a long service life and is relatively inexpensive to manufacture.

SUMMARY OF THE INVENTION

These objects are attained according to the present invention in a spring element comprising a pair of generally parallel elongated bendable but relatively incompressible first leaf springs having spaced-apart inner ends and opposite spaced-apart outer ends. These outer ends are rigidly interconnected. A second bendable but relatively incompressible leaf spring has an inner end spaced between and parallel to the inner end of the first springs and an outer end turned away from the first springs, so that this second spring does not lie generally between the first springs but only has one end received between the first springs. A respective body of elastomeric material is received between each of the inner ends of each of the first springs and the inner ends of the second springs, the bodies being bonded to the inner ends of the first and second springs.

Thus it can be seen that in the spring elements according to the invention the leaf springs do not extend from one end to the other, but have overlapping inner ends interconnected by elastomeric bodies. The bodies offer superior damping. Such a structure almost completely eliminates the transmission of high-frequency sound vibrations from one end of the spring to the other, as the elastomeric bodies hardly transmit such vibrations at all. In addition the service life of such a spring element is extended considerably because the leaf springs are subjected only to bending stress, the shear forces all being absorbed by the elastomeric body.

According to another feature of this invention each of the leaf springs is made of a relatively incompressible material such as steel or fiberglass-reinforced synthetic resin, and is of generally uniform thickness while being tapered from its outer end toward its inner end. In this manner an extremely efficient use of materials is obtained so that the structure can be produced relatively inexpensively. In the middle of the spring, that is the region where the inner ends overlap each other, the bending moment and the loading are zero so that this spring need not be heavy in this region.

According to another feature of the present invention the outer ends of at least the first leaf springs are separated by a spacer having less compressibility than the elastomeric body and more compressibility than the leaf springs. Thus in a typical spring a spacer would be used having a modulus of elasticity in the order of approximately 100,000 kg/cm$^2$, compared to steel having a value of 2,100,00 kg/cm$^2$, and rubber having between 30 and 100 kg/cm$^2$. The first leaf springs are advantageously bonded to this spacer, which is generally made of hard paper or asbestos, and the outer ends and spacer are formed with registering holes, permitting this end of the spring element to be bolted to either a motor-vehicle engine or the motor-vehicle frame.

According to yet another feature of the invention the elastomeric body is provided not only in the region at the middle of the spring where the inner ends overlap, but extends from this region in at least one direction all the way to the spacer between the outer ends of the first or second leaf springs, where plural second leaf springs are provided.

According to a further feature of the present invention the second leaf spring received between the inner ends of the first leaf springs is actually a pair of parallel spaced-apart leaves separated by a thin spacer sheet having approximately the same modulus of elasticity as the above-described spacer body between the outer ends. This double second leaf spring allows the spring elements according to the invention to be stacked so that an extremely stiff spring can be obtained if desired. The inner ends of the leaf springs constituting such a spring element according to the invention are all provided with registering throughgoing holes, and a bolt is provided to clamp these inner ends together and thereby form single spring elements. In accordance with yet another feature of this invention the leaf springs have coplanar longitudinal axes and are symmetrical about these axes. Thus each leaf spring is a flat strip of uniform thickness having longitudinal edges symmetrical about the respective longitudinal axis and converging toward the inner end of the leaf spring. In this manner the material of the spring is used extremely advantageously since the bending moment decreases linearly from the ends of the spring element towards the middle thereof. With a corresponding reduction in the overall cross-sectional size of the spring element a constant ratio is obtained between the bending moment and the loading along the entire length of the spring element, so that the spring element will bend uniformly, that is in a circular arc. This allows the maximum possible displacement between the two ends of the element.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
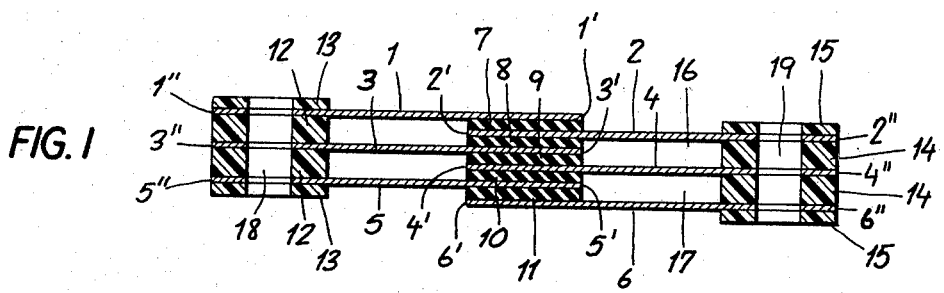
FIGS. 1 and 2 are longitudinally sectional and top views, respectively, through a spring element according to the present invention.
Figure 2:
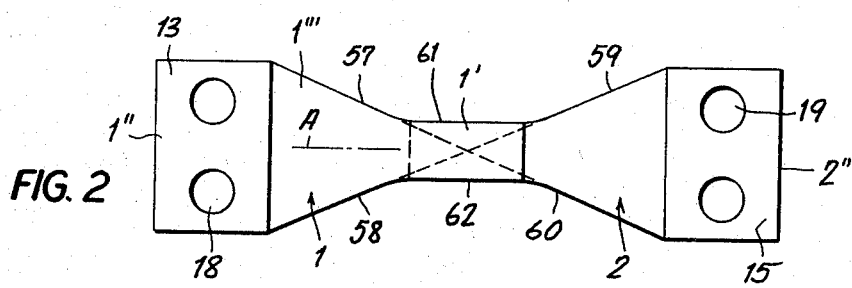

The spring element shown in FIGS. 1 and 2 comprises three first leaf springs 1, 3 and 5 made of spring steel and all congruently spaced one above the other, and three second leaf springs 2, 4 and 6, identical to the springs 1, 3 and 5 and similarly congruently spaced one above the other. The springs 1, 3 and 5 have inner ends 1', 3' and 5', which are interleaved with the inner ends 12', 4' and 6' of springs 2, 4 and 6. These inner end regions 1' – 6' are spaced apart by bodies 7, 8, 9, 10 and 11 of elastomeric material having a modulus of elasticity equal to approximately 30 to 100 kg/cm². The bodies 7–11 are received totally within the projected outline of the ends 1'–6'. The outer ends 1'', 3'', 5'' of springs 1, 3, and 5 are separated by rectangular perforated spacers 12 formed of hard paper and cover sheets 13 overlie the end regions 1'' and 5''. A bore 18 is formed through all of the ends 1'', 3'', and 5''. The outer ends 2'', 4'', and 6'' of the leaf springs 2, 4, and 6 are separated by similar paper spacers 14, with protective sheets 15 overlying the ends 2'', 4'', and 6'', and a transverse bore 19 extending through all of these ends 2'', 4'', and 6'' as well as through the elements 14 and 15. FIG. 2 illustrates how the element 1 is formed between its rectangular inner end 1' and its rectangular outer end 1'' with a trapezoidal intermediate region 1''' having edges 57 and 58 lying symmetrically to opposite sides of a central axis A of the spring element. The end section 1' has edges 61 and 62 parallel to the axis A. The leaf spring 2 is similarly formed with converging straight edges 59 and 60, as are the other elements 3–6. Imaginary continuations of edges 57–60 all meet at a single point in the center of the end section 1'.

Figure 3:
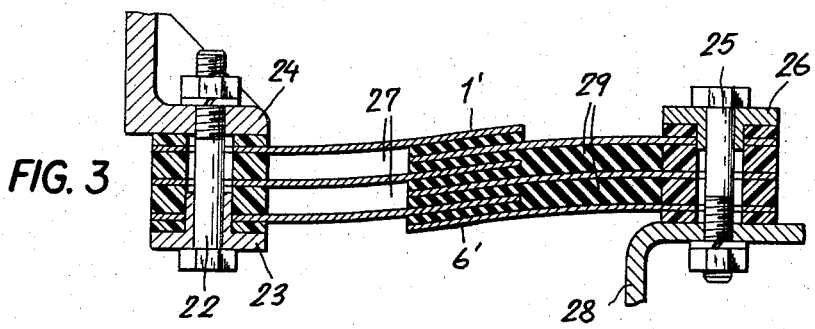
FIG. 3 is a longitudinal section through another configuration according to the present invention.

The spring element shown in FIG. 3 is substantially identical to that shown in FIGS. 1 and 2 except that here the spaces 27 between the ends 1' – 6' and the ends 1'', 3'', and 5'' are left free as shown in FIGS. 1 and 2, and the spaces 29 between the ends 1' – 6' and the ends 2'', 4'', and 6'' are filled with the elastomeric material constituting the bodies 8–11. A bolt 22 secures the ends 1'', 3'', and 5'' to a support 24, this bolt 22 being fitted via a T-washer 23 into the hole 18. Another bolt 25 and T-washer 26 secure the ends 2'', 4'', and 6'' to a frame 28 of a motor vehicle.

Figure 4:
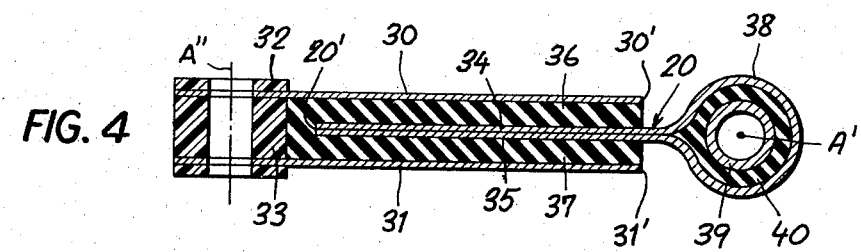
FIGS. 4 and 5 are longitudinally sectional and top views, respectively, of yet another spring element according to this invention.
Figure 5:
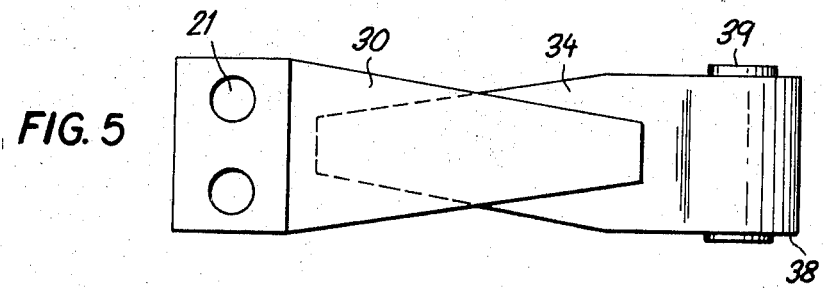

The spring shown in FIGS. 4 and 5 comprises a pair of identical first leaf springs 30 and 31 sandwiching a second leaf spring 20 formed of a single steel sheet bent over so as to have an eye 38 and a pair of arms 34 and 35 constituting the spring 20. A pair of elastomeric bodies 36 and 37 are bonded to the springs 30, 34, 35, and 31 and are actually part of a single elastomeric body formed in place in the spring. The outer ends of the springs 30 and 31 are separated by a spacer 33 and overlain by cover bodies 32, and the eye 38 is provided with a steel sleeve 39 received within an elastomeric tube 40 bonded both to the tube 39 and the eye 38. Tube 40 has an axis A' which is parallel to the planes of the springs 30, 20, and 31, and perpendicular to the axis A'' of the hole 21 through the outer end of the springs 30 and 31. These springs 30, 20, and 31 are tapered evenly toward their inner ends 30', 20', and 31'. The end 20' is squared off, and separated from the spacer 33 by a gap narrower than 10% of its overall length.

Figure 6:
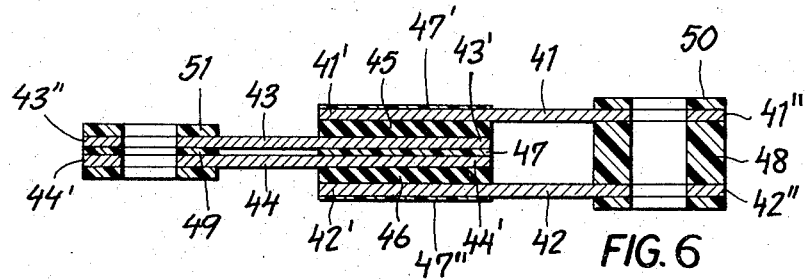
FIG. 6 is a longitudinal section through a composite spring element according to the present invention wherein one of the leaf springs is doubled.

The spring elements shown in FIG. 6 comprise a pair of first leaf springs 41 and 42 having outer ends 41'' and 42'' separated by a spacer 48 and overlain by protective bodies 50. The inner element is formed of identical leaf springs 43 and 44 having outer ends 43'' and 44'' held apart by a thin spacer sheet 49 of relative incompressible synthetic-resin material. The inner ends 43' and 44' of springs 43 and 44 constituting the inner leaf spring of the element are similarly separated by a sheet 47. Bodies 45 and 46 of elastomeric material are bondedd between the inner ends 43' and 44' and inner ends 41' and 42' of the springs 41 and 42 respectively. The outer faces of the ends 41' and 42' are provided with thin coatings 47' and 47'' which, when the springs are stacked together form the spacer layer 47 as will be described hereinafter.

Figure 7:
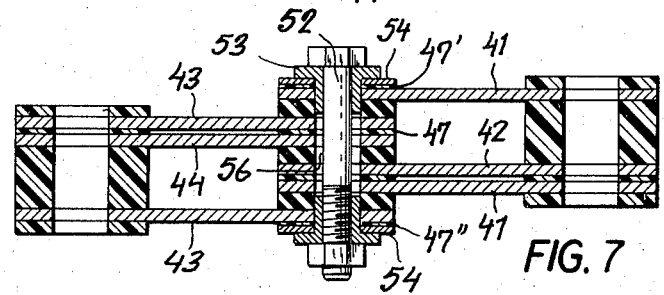
FIGS. 7 and 8 are longitudinally sectional and top views, respectively, of another spring according to this invention corresponding generally to the spring of FIG. 6.

Another such leaf spring 41 and spring 43 can be combined with the assembly shown in FIG. 6 to produce an arrangement as shown in FIG. 7 wherein three leaf springs 41, 42, and 41 and three leaf springs 43, 44 and 43 project to each side of a central region provided with a bolt 52 secured through two T-washers 53 bearing on washers 54 on the coating 47' and 47''. The hole 56 through the ends 41', 42', 43', 44' is slightly larger in diameter than the bolt 52 so that this bolt 52 will not inhibit sliding of the spring element 41, 44 relative to each other. Such an assembly can be made up by the user: he need merely be supplied with a plurality of elements 41 and 43, for example, interconnected by a body 45 and bearing the layers 47' and 47'' and merely form a stack as high as is needed for the particular requirement.

It is possible with such an assembly to obtain a relatively stiff spring having a relatively compact size, since the doubling-up of leaf springs increases the load-bearing capacity of the springs considerably, while the interposition of the spacer sheets and elastomeric bodies insures that all of the above-given properties of the springs according to the present invention are retained.

Figure 8:
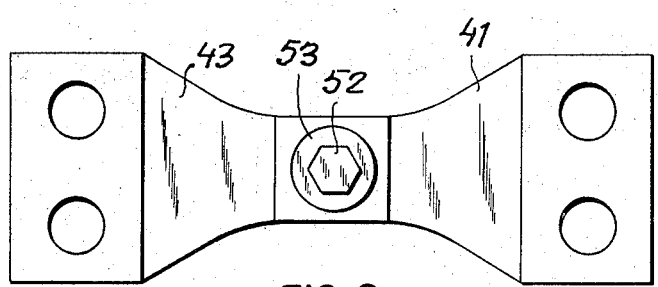
Figure 9:
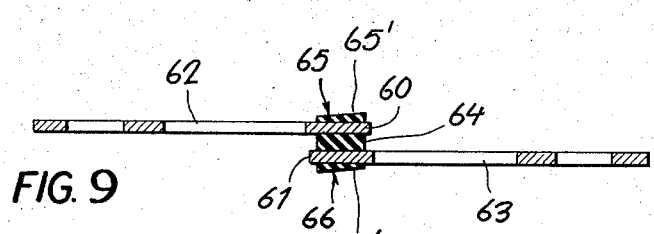
FIGS. 9 and 10 are longitudinally sectional and top views, respectively, of a further spring in accordance with the present invention.
Figure 10:
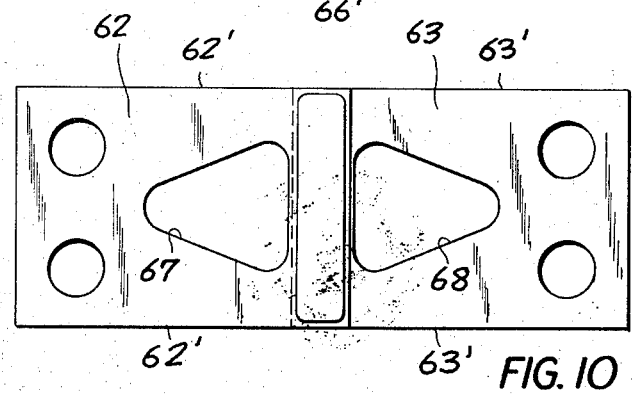

In order to create a bending moment which decreases linearly from the ends of the spring element toward the middle thereof it is possible as shown in FIGS. 9 and 10 to make the outer endes 62' and 63' of a pair of identical leaf springs 62 and 63 parallel. Each of these springs 62 and 63 is formed with a respective stamped-out hole 67 and 68 which is of increasing width toward its inner end 60 and 61 and the other spring. An elastomeric body 64 is vulcanized in place between these inner ends 60 and 61 and small elastomeric bumpers 65 and 66 are formed on the outer faces of the respective inner ends 60 and 61 so as to allow the springs to be stacked as shown with reference to FIGS. 7 and 8. The outer surfaces 65' and 66' of the bumpers 65 and 66 are parallel to each other but not to the planes of the springs so that when stacked the spring elements will be coupled together. Such a formation has the advantages described above with reference to FIGS. 1 – 8, and the particularly small region of overlap which is possible due to the relatively broad inner ends 60 and 61 causes the two springs 62 and 63 to bear on each other virtually at a point for most advantageous force transmission.

It is possible according to the various embodiments of the present invention to make up a composite spring which is resistant to corrosion and temperature and has an extremely long service life since the steel or fiberglass-reinforced leaf springs which are known to be extremely rugged but are usually unusable as engine mounts, are supplemented by elastomers which can resist sheer stresses over a long period of time without breaking down. The spring is inexpensive to manufacture and capable of withstanding extremely large longitudinal stresses. It transmits neither sound vibration nor electricity from one end to the other, so that it is usable in many applications where conventional leaf srpings would be unusable.

I claim:

1. A spring element comprising:
a pair of generally parallel elongated bendable but relatively incompressible first leaf springs having spaced-apart inner ends and opposite spaced-apart outer ends;
means for rigidly connecting together said spaced-apart outer ends of said first springs;
a second bendable but relatively incompressible leaf spring having an inner end spacedly received between and parallel to said inner ends of said first springs and an outer end turned away from said first springs; and
a respective body of elastomeric material between each inner end of each first spring and said inner end of said second spring, said bodies being bonded to said inner ends.

2. The element defined in claim 1 wherein said leaf springs are flat and have longitudinal edges converging toward their inner ends.

3. The element defined in claim 2 wherein said means includes a rigid spacer received between said outer ends of said first springs and of lesser compressibility than said bodies.

4. The element defined in claim 3 wherein said second leaf spring includes a pair of like spacedly parallel and congruous leaves and having inner and outer ends and at least one spacer sheet between said inner and outer ends of said leaves.

5. The element defined in claim 4 wherein said spacer sheet has a thickness substantially less than the thickness of said body.

6. The element defined in claim 5, further comprising clamping means for securing said leaves together at their said inner ends.

7. The element defined in claim 6 wherein said springs are formed with registering holes at their said inner ends, said clamping means including a bolt spacedly traversing said holes.

8. The element defined in claim 3, further comprising another such second spring and another such body between the inner end of said other second spring and the inner end of one of said first springs, each of said springs being a single spring-steel leaf.

9. The element defined in claim 3 wherein said springs are formed between said inner and outer ends with an intermediate region of uniform thickness and regularly tapering cross-sectional area.

10. The element defined in claim 9 wherein said springs are each formed at their inner ends with an end section of uniform cross-sectional area, and said longitudinal edges are symmetrical to the longitudinal axes of said springs.

11. The element defined in claim 1 wherein said leaf springs are each of decreasing cross-sectional area from the respective outer end to the respective inner end.

* * * * *